United States Patent Office 2,912,466
Patented Nov. 10, 1959

2,912,466

PROCESS FOR PREPARING QUATERNARY PHOSPHONIUM COMPOUNDS

Martin Reuter, Frankfurt am Main, Germany, assignor to Farbwerke Hoechst Aktiengesellschaft vormals Meister Lucius & Brüning, Frankfurt am Main, Germany, a corporation of Germany No Drawing. Application October 28, 1957
Serial No. 692,541

Claims priority, application Germany November 3, 1956

8 Claims. (Cl. 260—606.5)

It is known to prepare quaternary phosphonium compounds starting from phosphine, aldehydes and strong acids, for instance hydrochloric acid, by causing phosphine to act upon a mixture consisting of aldehydes and hydrohalic acid. It is presumed that the compounds are of the composition $(HOCHR)_4PX$, R representing hydrogen or an organic hydrocarbon radical and X standing for halogen.

It is also known that the mixture of formalin and hydrochloric acid takes up the phosphine only slowly and that the reaction cannot be accelerated by raising the temperature because of the danger of phosphine explosions (compare Journ. Am. Chem. Soc. (1955), page 3923).

It is further known that an acceleration of the phosphine absorption can be realized by vigorously stirring the reaction solution; in the rapid stirrer necessary for this purpose the packing of the stuffing box, however, easily gets hot. Since in most cases this spot is not tight, the escaping phosphine regularly ignites and it is difficult to extinguish the fire. It has likewise been recommended to react metal phosphides directly with aldehydes in an acid medium. Although in this manner the separate preparation of phosphine is dispensed with, the solution of the reaction products is rendered impure by large amounts of metal salt which have to be removed in a circumstantial manner by precipitation reactions and filtrations.

In addition to the disadvantages mentioned above the imperfection of these processes is shown by the fact that no quaternary phosphonium compounds have hitherto been prepared from aldehydes, phosphine and weak acids.

The present invention is based on the observation that it is possible to prepare in an industrially advantageous manner quaternary phosphonium compounds from phosphine, aldehydes and acids by carrying out the reaction of the components in the presence of small amounts of heavy metals or their water-soluble salts. As heavy metals there are particularly suitable mercury in the form of the metal or of the chloride, iron chloride, silver nitrate, platinum-(IV)-chloride. It is likewise possible to use several metals or salts simultaneously. The addition of these metals or of their salts causes a considerably raised reaction velocity at moderate temperatures without requiring the use of rapid stirrers. The products obtained according to the invention are used particularly as textile fireproofing agents. The compounds obtained on the basis of weak acids possess the advantage of not requiring the addition of alkalies for the impregnation baths in contradistinction to the corresponding products based on strong acids.

The following examples serve to illustrate the invention, but they are not intended to limit it thereto.

Example 1

21 grams of phosphine (0.6 mol) are introduced within 7 hours into a mixture of 216 grams of formalin (2.6 mols) of 37% strength and 0.6 mol of concentrated hydrochloric acid in which 1 gram of metallic mercury is suspended by stirring. The phosphine is practically completely taken up, the reaction heat being eliminated by cooling to about 30–35° C. The colorless solution of the tetrahydroxymethyl-phosphonium chloride is decanted from the metallic mercury and is then evaporated to dryness at 40° C. under reduced pressure. Yield: 117 grams of a crystalline product; melting point 145° C. Without the simultaneous use of mercury about double the time is required for the absorption of phosphine; instead of the indicated amount of mercury there can be used with equal success 0.5 gram of silver nitrate or 0.3 gram of platinum-(IV)-chloride.

Example 2

21 grams of phosphine (0.6 mol) are introduced within 8 hours, while stirring, into a mixture of 216 grams of formalin (2.6 mols) of 37% strength and 34 grams of hydrofluoric acid (0.65 mol) of 38% strength in which 2 grams of mercury-(II)-chloride have been dissolved or 1 gram of mercury metal has been suspended. The phosphine is taken up practically completely. The reaction heat is eliminated by cooling and the temperature is maintained at about 30–35° C. The major part of the mercury chloride is transformed into a water-insoluble, brown mercury compound. This mercury compound or the mercury metal is filtered off and the colorless, weakly acid reaction solution (pH value about 5.5) is evaporated to dryness at about 40° C. under reduced pressure. 36 grams of a colorless, wax-like product are obtained which, when recrystallized from a little methanol furnishes in good yield needle-shaped crystals melting at 98° C. The analytical composition corresponds to the formula $(HOCH_2)_4PF$. The tetrahydroxy-methylphosphonium-fluoride hitherto unknown is very easily soluble in water (pH about 5), but sparingly soluble in ether, methylene chloride and dioxane; it forms a picrate melting at 150° C. and being identical with the picrate derived from tetrahydroxy-methyl-phosphonium chloride.

Without addition of mercury or mercury chloride the above-mentioned amount of phosphine is taken up much more slowly by the mixture of formalin and hydrofluoric acid, i.e. within about 30 hours and nearly without development of heat, but the same substance is obtained if the mixture is worked up in the same manner.

Example 3

51 grams of phosphine are introduced within 9 hours, while stirring, into a mixture consisting of 585 grams of formalin of 30.8% strength (=6 mols) and 90 grams of anhydrous acetic acid (=1.5 mols) in which 2 grams of mercury-(II)-chloride have been suspended. The phosphine is taken up practically completely. The temperature of the reaction mixture is maintained at about 30–35° C. by cooling. The mercury chloride is thereby transformed partially into a water-insoluble brown mercury compound and partially into metallic mercury. This compound or the mercury metal is filtered off and the colorless weakly acid reaction solution (ph value about 5) is evaporated to dryness at about 40° C. under reduced pressure. As residue there is obtained in a yield of 280 grams a yellowish oil which soon solidifies into crystals; melting point of the crystals 89° C. By recrystallization from ethanol or isopropanol the tetrahydroxymethyl-phosphonium-acetate is obtained in an analytically pure form (melting point 91° C.) and in good yield. It corresponds to the formula $$(HOCH_2)_4P(CH_3CO_2)$$

It is very easily soluble in water with a weakly acid reaction (pH=5.5), but it is insoluble in ether, dioxane and acetone; it likewise forms a picrate melting at 150° C., which is identical with the aforementioned picrates. Instead of mercury chloride there can be used with the same success an equal amount of iron chloride, silver nitrate or copper sulfate; tin-(IV)-chloride shows a slightly weaker effect.

Without addition of these metals, the phosphine absorption at the beginning takes place considerably more slowly and without development of heat; it is practically finished after about 20 grams corresponding to 40% of the theory have been taken up. By working up there is obtained a mixture of the above mentioned phosphonium compound containing a large amount of polyoxy-methylene which cannot be separated by recrystallization.

*Example 4*

26 grams of phosphine (=0.75 mol) are introduced within about 9 hours while stirring at about 30° C. into a solution consisting of 300 grams of formalin of 30% strength (=3 mols), 47 grams of crystalline oxalic acid (=0.375 mol) and 50 cc. of water, containing also 0.3 gram of platinum-(IV)-chloride. With slight spontaneous heating of the reaction mixture the phosphine is taken up practically completely. The almost clear, weakly yellowish reaction solution is evaporated to dryness at about 40° C. under reduced pressure.

As residue 140 grams of a yellowish oil are obtained which, during cooling, solidifies to a wax-like substance. The wax is easily soluble in water with a weakly acid reaction (pH about 5) as well as in methanol; it is insoluble in ether. It can be recrystallized with good yield from a little methanol. Thus, the tetra-hydroxymethyl-phosphonium-oxalate hitherto unknown is obtained in an analytically pure form (melting point 97° C.) which corresponds to the formula $[(HOCH_2)_4P]_2(C_2O_4)$. This compound is sparingly soluble in ethanol and isopropanol.

If, instead of the above-mentioned quantity of platinum-(IV)-chloride, 1 gram of silver nitrate or mercury-(II)-chloride is used the same result is obtained with slow phosphine absorption. Without the addition of a metal phosphine absorption does not take place.

*Example 5*

26 grams of phosphine (0.75 mol) are introduced within about 9 hours at about 30° C. while stirring into a solution of 300 grams of formalin of 30% strength (=3 mols) and 67 grams of lactic acid (0.75 mol) to which 1 gram of mercury-(2)-chloride had been added. With spontaneous heating of the reaction mixture the phosphine is practically completely absorbed; the reaction heat is removed by external cooling.

The small amount of the brown, water-insoluble mercury compound is filtered off and the colorless, weakly acid filtrate (pH of about 5) is evaporated to dryness under reduced pressure. 183 grams of a viscous, colorless oil solidifying in the cold are obtained as residue. It is easily soluble in methanol, ethanol and isopropanol and insoluble in ether, acetone and benzene. The product corresponds to the formula $$(HOCH_2)_4P(CH_3CHOHCO_2)$$

Without addition of mercury-chloride the phosphine absorption needs more time and ceases after two thirds of the theoretical amount have been taken up.

If, instead of lactic acid, the equivalent amount of formic acid or sulfuric acid or of p-toluenesulfonic acid and, instead of mercury-(II)-chloride, the equivalent amount of silver sulfate is used, while operating in the same manner as described above, the tetra-hydroxymethyl-phosphoniumformate or -sulfate or toluenesulfonate is obtained.

We claim:

1. A method of preparing a quaternary phosphonium compound which comprises reacting phosphine, formaldehyde and an acid of the group consisting of hydrohalic acids, sulfuric acid, p-toluene sulfonic acid, saturated low molecular weight aliphatic carboxylic acids and saturated aliphatic low molecular weight hydroxy carboxylic acids in the presence of a catalytic amount of a catalyst of the group consisting of mercury, tin, the heavy metals of groups I and VIII of the periodic system and the water-soluble salts thereof with nitric acid and the aforesaid acids.

2. The process as defined in claim 1 wherein the catalyst is mercury.

3. The process as defined in claim 1 wherein the catalyst is a water-soluble salt of a heavy metal of group VIII of the periodic system.

4. The process as defined in claim 1 wherein the catalyst is a water-soluble chloride.

5. The process as defined in claim 1 wherein the catalyst is a mixture of water-soluble metal salts.

6. The process as defined in claim 1 wherein the catalyst is silver nitrate.

7. The process as defined in claim 1 wherein the catalyst is copper sulfate.

8. The process as defined in claim 1 wherein the catalyst is silver sulfate.

References Cited in the file of this patent

FOREIGN PATENTS 1,011,978   France _____ July 2, 1952

OTHER REFERENCES

Kosolapoff: "Organophosphorus Compounds," John Wiley & Sons, New York, N.Y., 1950; p. 81 relied on.